United States Patent [19]
Cherry et al.

[11] 3,940,067
[45] Feb. 24, 1976

[54] AXISYMMETRICAL ANNULAR PLUG NOZZLE

[75] Inventors: Charles C. Cherry, McGregor; Lewis C. King, Dallas, both of Tex.

[73] Assignee: The United States of America as represented by the Secretary of the Navy, Washington, D.C.

[22] Filed: Feb. 3, 1969

[21] Appl. No.: 798,256

[52] U.S. Cl............................... 239/265.11; 60/253
[51] Int. Cl.² ........................................ B63H 11/00
[58] Field of Search..... 239/265.11, 265.15, 265.19; 60/271

[56] References Cited
UNITED STATES PATENTS

| | | |
|---|---|---|
| 3,113,429 | 12/1963 | Davies .................................. 60/271 |
| 3,156,091 | 11/1964 | Kraus............................ 239/265.11 |
| 3,200,585 | 8/1965 | Climent et al. ..................... 138/177 |
| 3,434,291 | 3/1969 | Friedman............................. 60/254 |

*Primary Examiner*—Samuel Feinberg
*Attorney, Agent, or Firm*—R. S. Sciascia; R. F. Beers; P. Schneider

[57] ABSTRACT

An annular plug nozzle for a rocket propulsion unit, designed for the shortest possible length, and contoured wall structure capable of withstanding exposure to motor chamber and exhaust environment for extended operating time.

9 Claims, 11 Drawing Figures

PERFORMANCE COMPARISON OF STRAIGHT WALL AND CONTOURED WALL ANNULAR PLUG NOZZLES.

INVENTORS
CHARLES C. CHERRY
LEWIS C. KING

BY

ATTORNEY

MACH NUMBER PROFILES OF ANNULAR NOZZLES

WALL PRESSURE PROFILES OF ANNULAR NOZZLE

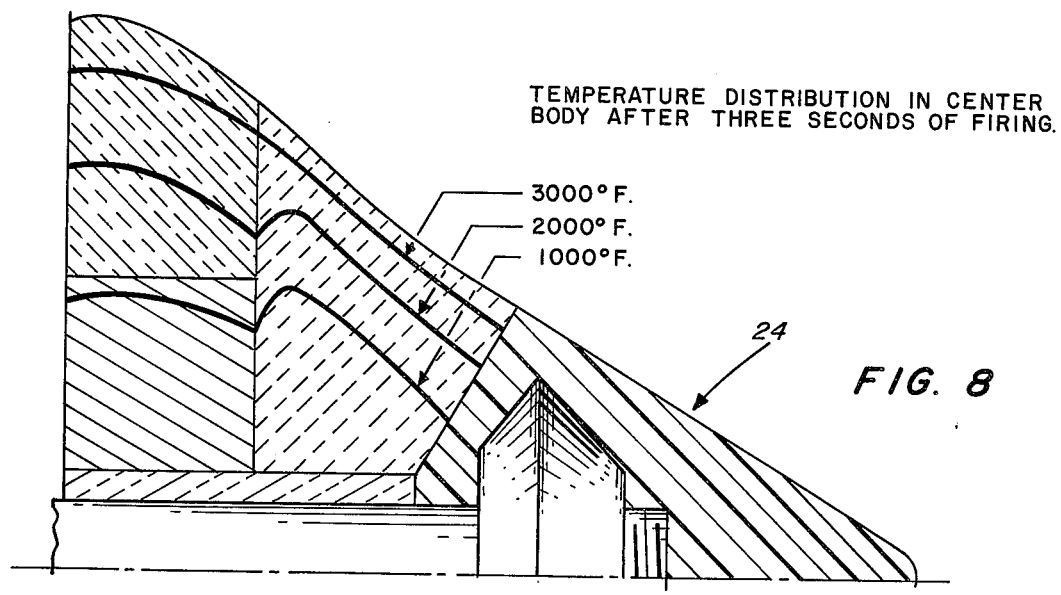
FIG. 8 — TEMPERATURE DISTRIBUTION IN CENTER BODY AFTER THREE SECONDS OF FIRING.
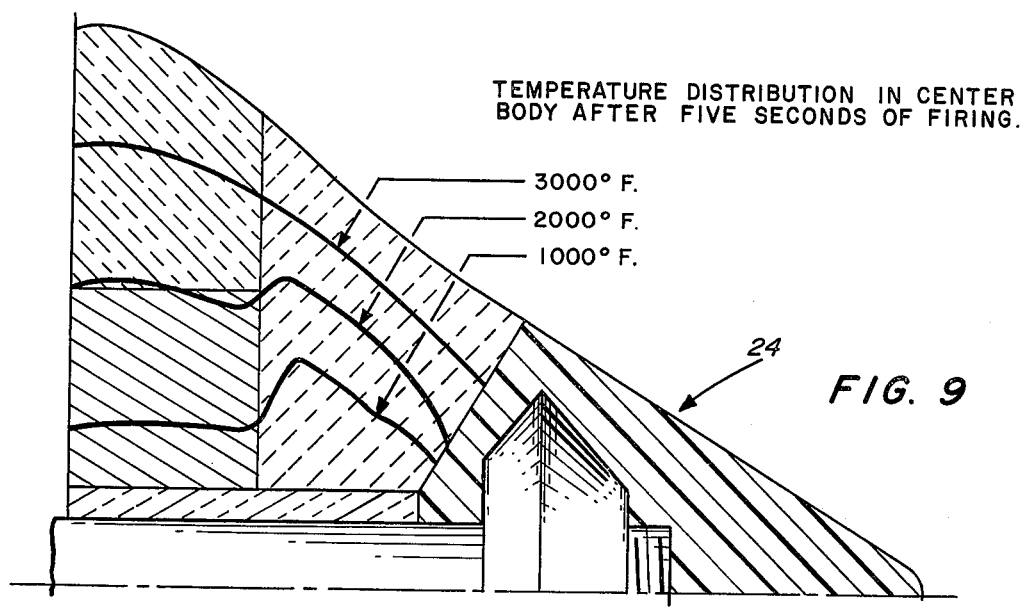
FIG. 9 — TEMPERATURE DISTRIBUTION IN CENTER BODY AFTER FIVE SECONDS OF FIRING.
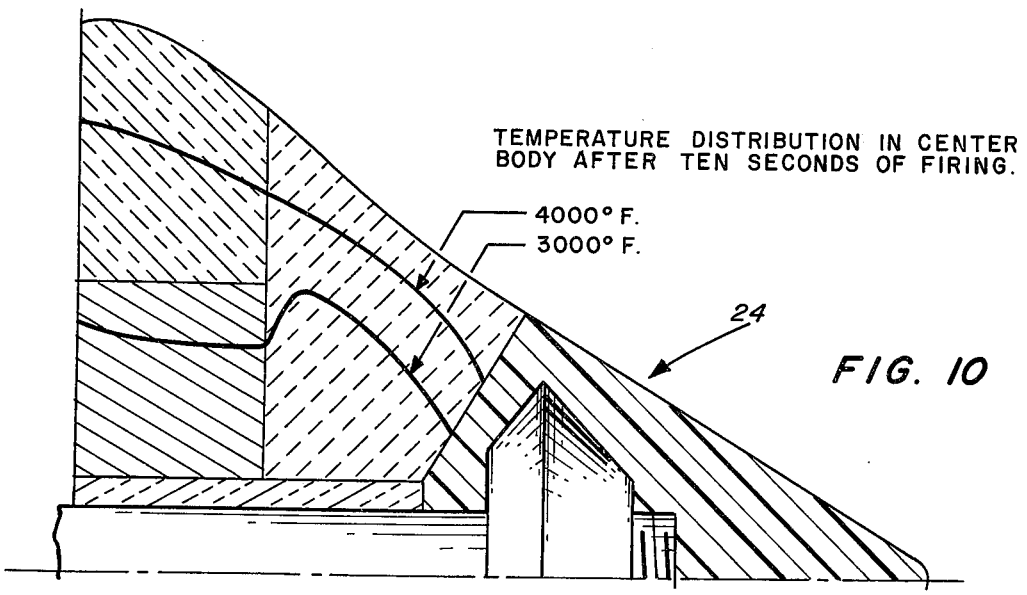
FIG. 10 — TEMPERATURE DISTRIBUTION IN CENTER BODY AFTER TEN SECONDS OF FIRING.

AXISYMMETRICAL ANNULAR PLUG NOZZLE

STATEMENT OF GOVERNMENT INTEREST

The invention defined herein may be manufactured and used by or for the Government of the United States of America for governmental purposes without the payment of any royalties thereon or therefor.

BACKGROUND OF THE INVENTION

1. Field of the Invention

This invention relates to nozzles for rocket motors and more particularly to the structural design having the shortest possible length to deliver maximum thrust and to the capability of withstanding exposure to motor chamber and exhaust environment.

2. Description of the Prior Art

The use of inserts in annular nozzles is not new, as shown in U.S. Pat. Nos. 3,200,585, 3,187,502 and 3,157,026, but these insets have not been designed with relation to the insulation of the shell of the nozzle with regard to heat, nor have they been of a plurality of materials. The need for an annular nozzle contoured by the insertion of inserts selected for their inherent values relating to heat insulation, and resistance to erosion is shown by the failure of many of this type of nozzle when put into actual practice.

SUMMARY OF THE INVENTION

The present invention is the provision of an annular nozzle, contoured by the insertion of inserts, which are selected for their inherent characteristics, such as heat insulation and resistance to erosion.

The nozzle was designed after consideration of three dominant criteria; namely, nozzle performance (thrust coefficient), thermal design and development flexibility. Nozzle configurations considered were isentropic spike, submerged spike, internal-external expansion, expansion deflection, submerged throat and symmetrical. Cooling mechanisms considered were transportation, pyrolysis, ablation and enthalpic with the physical characteristics of length, weight and fragility. Performance characteristics were the thrust coefficients and slip-stream susceptibility and other factors.

Study was conducted along three phases which eliminated various design concepts. The first phase considered the various designs with relationship to aerodynamic, ballistic, thermal characteristics, structural design, materials, fabrication and cost criteria. The second phase consisted of a study in a narrower field after eliminations, while the third lead to a selection of two competing designs with a preferred design concept of a symmetrical annular nozzle having contoured walls with centerbody support structure located in the upstream, subsonic region and the alternate design with the centerbody supports located in the transonic and supersonic regions, with extensive aerodynamic streamlining.

An object of the present invention is to provide an annular nozzle of shortest possible length that would provide maximum thrust.

Another object of the present invention is to provide an annular nozzle having wall contour selected to provide the maximum thrust, while at the same time providing curvature which will be most advantageously directed to the least erosion due to velocity of exhaust gases.

Another object of the present invention is to provide an annular nozzle formed of a material which will give a low erosion rate by reason of the inherent characteristics of that material.

It is a further object of the present invention to form certain different parts of an annular nozzle of steel, Graph-I-Tite G, MX4566 (a silica phenolic compound), Carb-I-Tex and of pyrolytic-graphite.

It is a still further object of the present invention to form an annular nozzle taking into consideration the erosion qualities of the material used, and to use a minimum thickness of such material.

It is a still further object of the present invention to provide an annular nozzle formed with a centerbody throat insert capable of withstanding a high thermal stress, which develops due to the absence of radial support, and to orient the material forming the throat area to a position of greatest thermal conductivity.

BRIEF DESCRIPTION OF THE DRAWINGS

The invention is described in the accompanying drawings, in which:

FIG. 8 shows temperature distribution after 3 seconds of firing.

FIG. 9 shows temperature distribution after 5 seconds of firing.

FIG. 10 shows temperature distribution after 10 seconds of firing.

DESCRIPTION OF THE PREFERRED EMBODIMENTS

Selection of the double-wall annular nozzle design was made after numerous tests which proved the annular design was the preferred configuration. The principal advantage of the annular nozzle over the conical nozzle is the reduction in length without significant degradation of thrust coefficient. It was found through experimentation that the annular nozzle is capable of yielding a performance equivalent to that of the current design but within a shorter total system length and that the annular structure will withstand exposure to the motor chamber and exhause environment for extended operating time. These two factors will allow the annular nozzle to improve the current propulsion system performance.

Ballistic analysis of the annular nozzle system was initiated by calculating (for straight-wall axisymmetric annular plug nozzles) the dependence of nozzle length on the following design variables: (1) radial location of the annular throat gap; (2) divergence angles of the inner and outer walls from the center line of the annular gap; and (3) ratio of the throat wall radii to the throat gap width. Results showed that the nozzle length was essentially independent of the ratio of throat wall radius to throat gap width. The ratio was therefore fixed at 1:1. The nozzle design to obtain maximum thrust at a given length was reduced to: (1) selection of the location of the annular gap; (2) determination of inner and outer wall contours in the expansion section; and (3) determination of the flow direction at the throat.

Upon calculation of the thrust coefficient data on straight-wall nozzles, the gain in motor performance as a consequence of motor length reduction (with attendant additional propellant loading increase) was estimated. From this investigation, and assuming additional improvement to be gained by wall contour optimization in lieu of straight walls, nozzle lengths were selected for computation of respective thrust coefficients of nozzles with optimum contours. The final step in nozzle design was achieved by reevaluation of motor performance improvement for the range of lengths of nozzles having optimum contours.

PERFORMANCE COMPARISON OF CONICAL NOZZLE AND ANNULAR PLUG NOZZLE AT SEAL LEVEL CONDITIONS (70 F)

|  | Conical Nozzle | Annular Plug |
|---|---|---|
| Average Chamber Pressure, psia | 1145 | 1145 |
| Nozzle Throat Area, sq. in. | 4.227 | 4.227 |
| Nozzle Length, in. | 4.50 | 2.25 |
| Expansion Ratio | 5.02 | 5.02 |
| Vacuum Thrust Coefficient | 1.601 | 1.625 |
| Impulse over Action Time, lb$_f$-sec | 21,900 | 23,500 |

Figure 3:
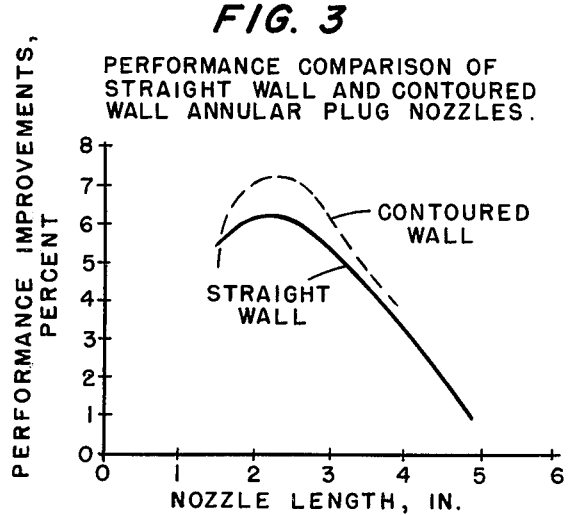
FIG. 3 is a graph on the performance comparison of straight wall and contoured wall annular plug nozzles.
Figure 4:
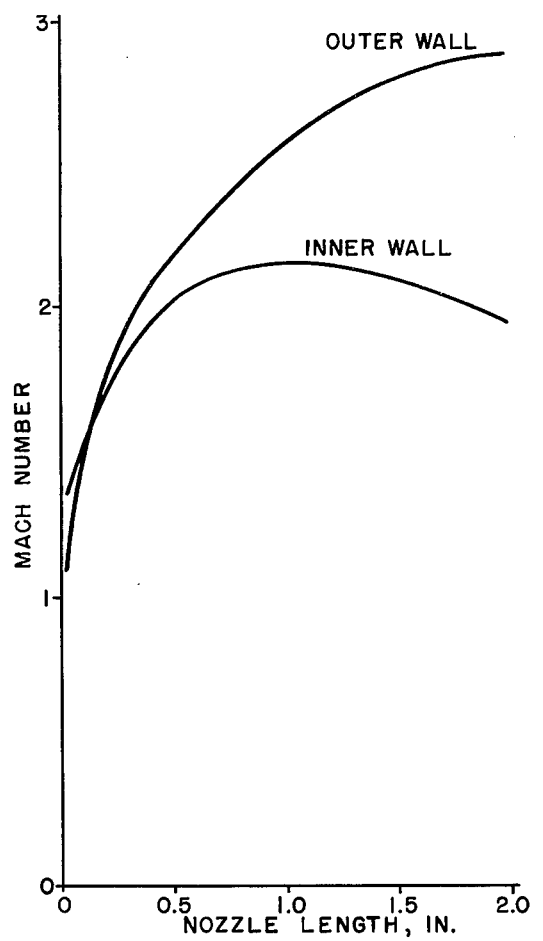
FIG. 4 is a graph showing comparison of motor performance with a current nozzle and, as estimated, with the nozzle forming the subject of this invention, with regard to Mach number.
Figure 5:
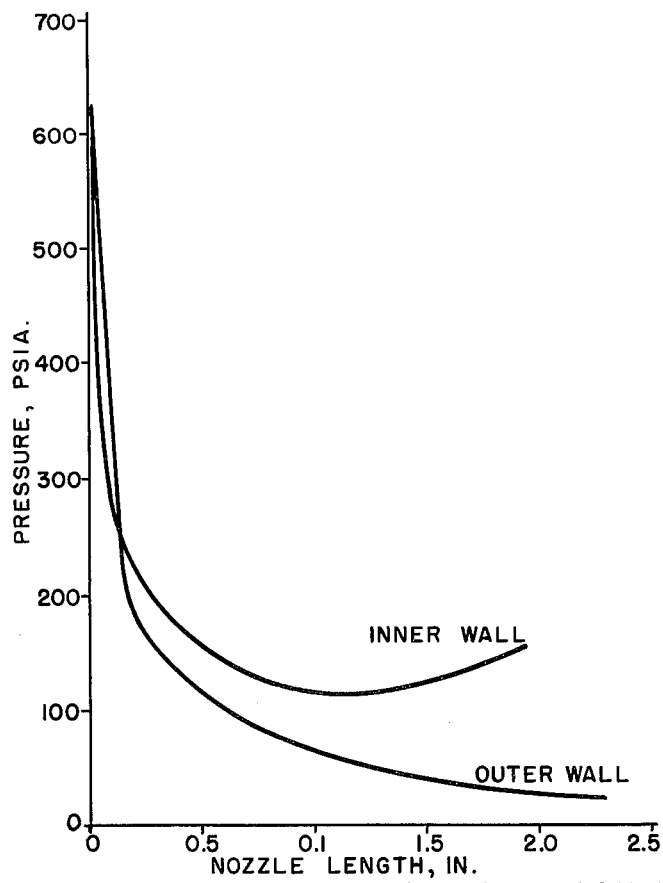
FIG. 5 is a similar comparison with regard to pressure.
Figure 6:
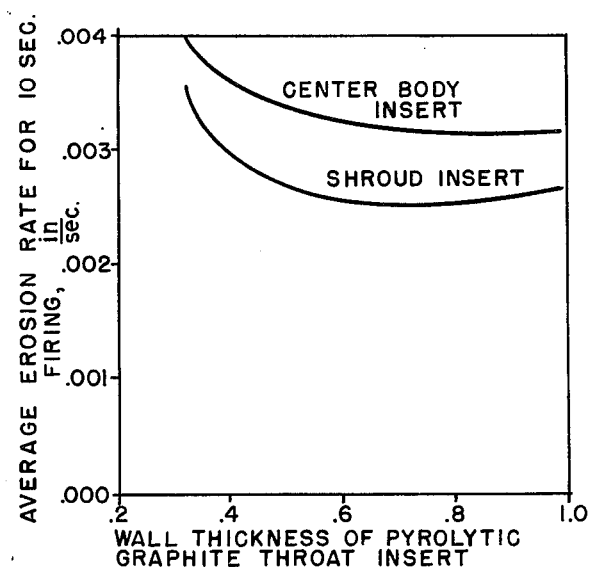
FIG. 6 is also a similar comparison with regard to temperature.

In FIG. 3 the advantages of contoured-wall annular plug nozzles over the straight-wall type is compared. The performance gain, as shown by the table, is due to two factors, the thrust coefficient improvement and the gain due to propellant weight increase. An inspection of the flow parameter profiles as indicated in FIGS. 3, 4 and 5 indicate disturbances along the centerbody surface. These manifestations of shock phenomena are related to the flow re-direction and boundary layer separation involved in turning the streamlines parallel to the nozzle centerline.

The erosion of the throat area will be constant with time and the rate of throat area change may be represented by the equation:

$$\frac{A_A}{A_1} = \sqrt{\frac{D_o + D_i}{D_o - D_i}}$$

This ratio for this particular construction is of the order of 3 and shows that the erosion on the annulus is three times more than the erosion of a simple conventional nozzle. It is therefore necessary that a material with high erosion resistance properties be used. The material used is pyrolytic-graphite and it is used as an insulating material. Tests prove that pyrolytic-graphite less than 0.6 of an inch thick was subject to severe corrosion making it necessary to establish the minimum thickness at 0.6 inch.

In order to make the system as light as possible, truncation of the annular nozzle is a means of removing mass. This truncation of the centerbody will decrease the thrust coefficient.

Figure 7:
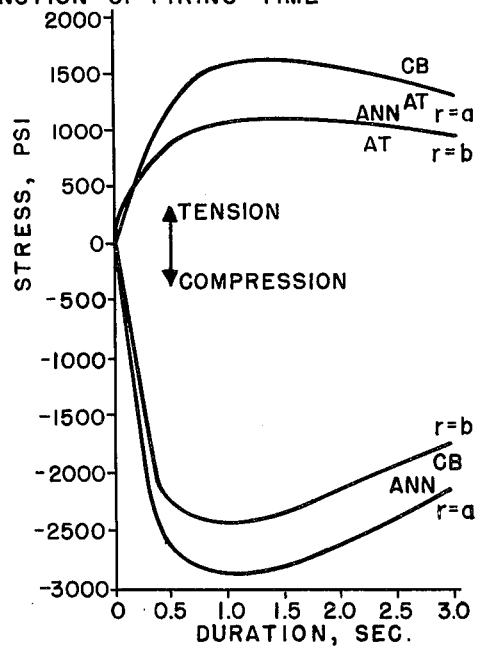
FIG. 7 shows the results of thermal stress in the centerbody throat insert.

The centerbody throat insert is required to withstand a high thermal stress, due partly to the absence of radial support. Further, the insert will be free to move in the axial direction due to the elastic material providing an expansion joint and will therefore be essentially in plane stress. The results of the stress from calculations are shown in FIG. 7. The strength of the pyrolytic-graphite is 20,000 psi at 3000° F and provides a satisfactory material capable of withstanding the temperatures without cracking. A thermal analysis of the temperature distribution in the centerbody, shown in the form of isotherms in FIGS. 8, 9 and 10 indicate an abrupt chamge at the junction between the graphite and the Carb-I-Tex. It is at this point that a large amount of heat is transferred from the pyrolytic-graphite the Carb-I-Tex. The annular nozzle is designed with a thin ring of $a$ direction pyrolytic-graphite to insulate the steel hardware from the high temperatures.

The design of the contour resulted in a larger diameter annulus for the throat and a shorter and greater diameter for the center body. This change of construction over previous models made it unnecessary to use a high temperature material and the struts were fashioned of 4130 steel, which offers the advantages of less cost, greater strength and greater ease in fabrication. The entrance area consists of an expanding conical outside wall which serves to direct the exhaust gases flowing down between the grain and the case into the nozzle throat and a conical inside wall which serves to direct the gases from the inner perforation of the grain into the nozzle. The shape of the entrance must conform to the motor case to which it is to be fitted. The material from which the walls of the entrance area is fashioned is Fiberite MXGE61 (a silica phenolic molding compound) and is used because of its low thermal conductivity and errosion resistance.

The need for struts to support the centerbody compromises the ballistics of the entrance area and the material used must be erosion resistant to the thermal environment of the combustion gases.

The erosion of the throat area is about from 5 to 9% and must have a material which would resist this erosion. Edge oriented pyrolytic-graphite used as a throat material will prevent the erosion from exceeding these limits, and provide high thermal conductivity.

Erosion of the walls of the expansion area of the nozzle is much less than at the throat plane and the material used at this section of the nozzle is Graph-I-Tite G which is insulated by a 0.1 inch thick $a$ direction pyrolytic-graphite sleeve. The aft portion of the outer exit wall is made of Fiberite MX4566 which is a silica phenolic molding compound. This part must be able to carry pressure loads which are transmitted into the retainer ring which holds the nozzle in place. To insure sufficient strength for this part, a steel load ring is molded into the phenolic compound.

The inner wall of the expansion area should have a material with a minimum compressive strength of 12,000 psi. The material used here is Carbon Cloth Carbon Bond Carb-I-Tex. Here because of the high thermal conductivity of the Carb-I-Tex material the steel support is insulated by a 0.07 inch sleeve of $a$ direction pyrolytic-graphite.

The aft portion of the inner wall is made from Fiberite MX4566. This material has a steel nut imbedded therein to transmit all pressure loads into the center rod. The joint between the Carb-I-Tex and the silica phenolic is tilted in order to carry the loads into the nut without introducing bending stresses into the silica phenolic molded part.

The annular nozzle is adapted to be attached to the casing 12 of a motor 13 (FIG. 11) by means of a retaining collar 14 threaded to the motor casing at 15. The rim 16 of the collar engages the shoulder 17 of the shell of the annular nozzle.

Figure 1:
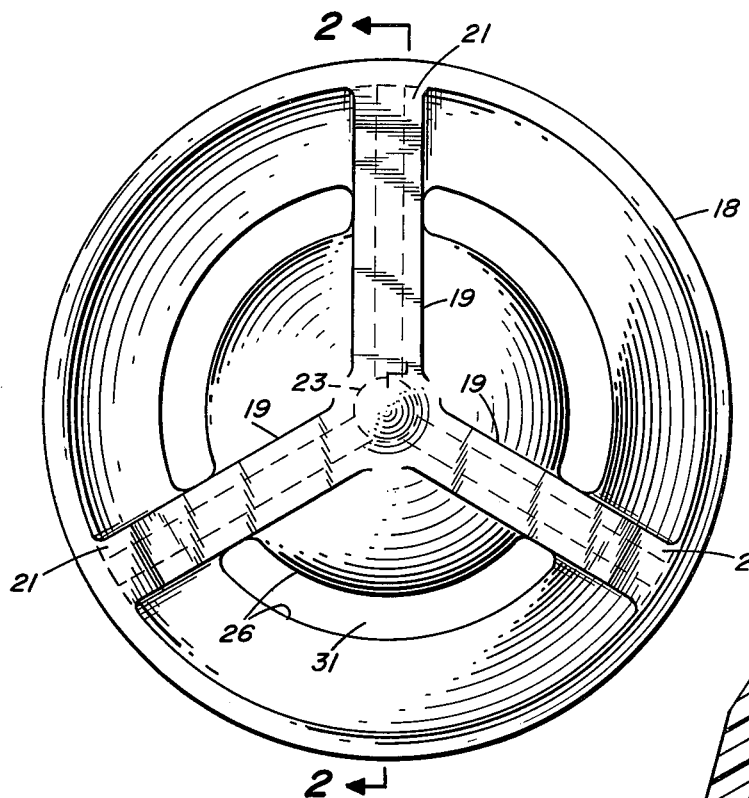
FIG. 1 is a front plan view of the nozzle.
Figure 2:
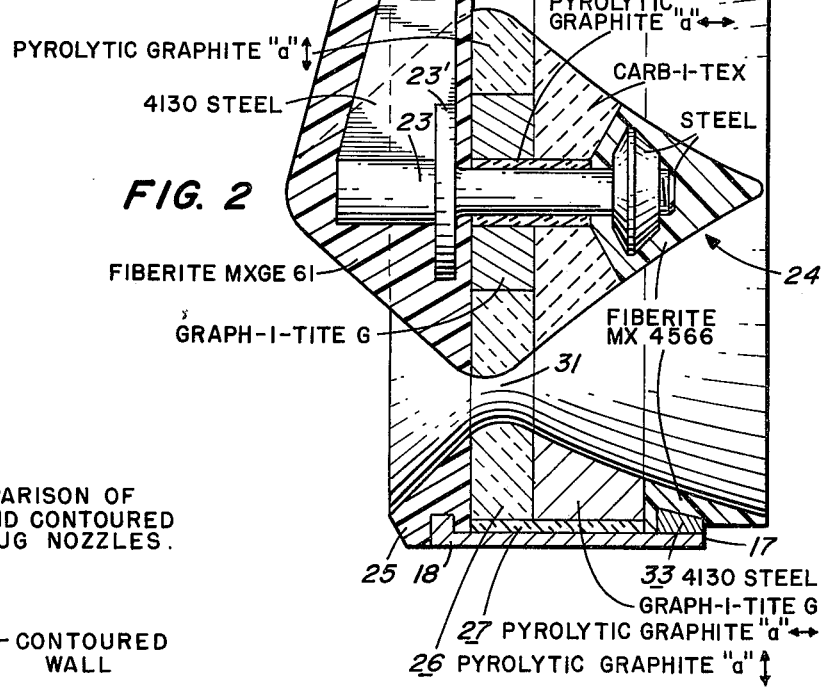
FIG. 2 is a sectional view taken on line 2—2 of FIG. 1.

The annular nozzle has an outside shell can-like body 18 to which is welded tripod arms 19 at their outer extremities 21. The inner junction 22 of the tripod arms is attached to a steel pin 23 formed with a shoulder 23 and which supports the inner centerbody 24. The inner wall of the shell 18 is contoured to the shape shown in the cross-section (FIG. 2) by annular inserts 25, 26, 27 and 28. The insert 25 is an insulator formed of MXGE61 steel. The insert 26 which forms the restricted throat area 31 is formed of edge oriented pyrolytic-graphite with the $a$ direction extending substantially perpendicular to the direction of gas flow. The insert 27 is formed of Graph-I-Tite G. The insert 28 is formed of Fiberite MX4566. These different materials are used to provide the most efficient distribution of heat and to withstand erosion and the thermal stresses present during the operation of the motor. Inserts 26 and 27 are spaced from the outer shell by a sleeve 32 of pyrolytic-graphite with the $a$ direction running parallel to the longitudinal axis of the sleeve. A ring 33 of 4130 steel is molded into the insert 28 to provide the necessary compressive strength to support the loads set up by the retaining collar 14.

The center body 24 is built up on the steel pin 23 to form the contoured inner wall of the nozzle. The forward end of the centerbody is provided with an inner washer or ring 34 formed of Graph-I-Tite G and serves as a heat sink. This ring 34 is insulated from the inner pin 23 by a sleeve 35 of pyrolytic-graphite with the $a$ direction in the direction of the longitudinal axis of the sleeve and is surrounded by an outer ring or washer 36 of edge oriented pyrolytic-graphite with the $a$ direction substantially radial. Passing towards the aft end of the centerbody, an annular Carb-I-Tex insert, insulated from the pin 23 by the sleeve 35 forms the next section of the contoured inner wall. The aft end 36 of the centerbody 24 is formed of the molding compound MX4566 and is of substantially conical shape and surrounding the steel nut 37.

In order for the parts formed of pyrolytic-graphite, where exposed to erosion, to be effective, the thickness must be at least 0.6 of an inch. Pyrolytic-graphite has extremely high thermal conductivity in the $a$ direction and is oriented wherever used in this structure to provide the most efficient use.

Figure 11:
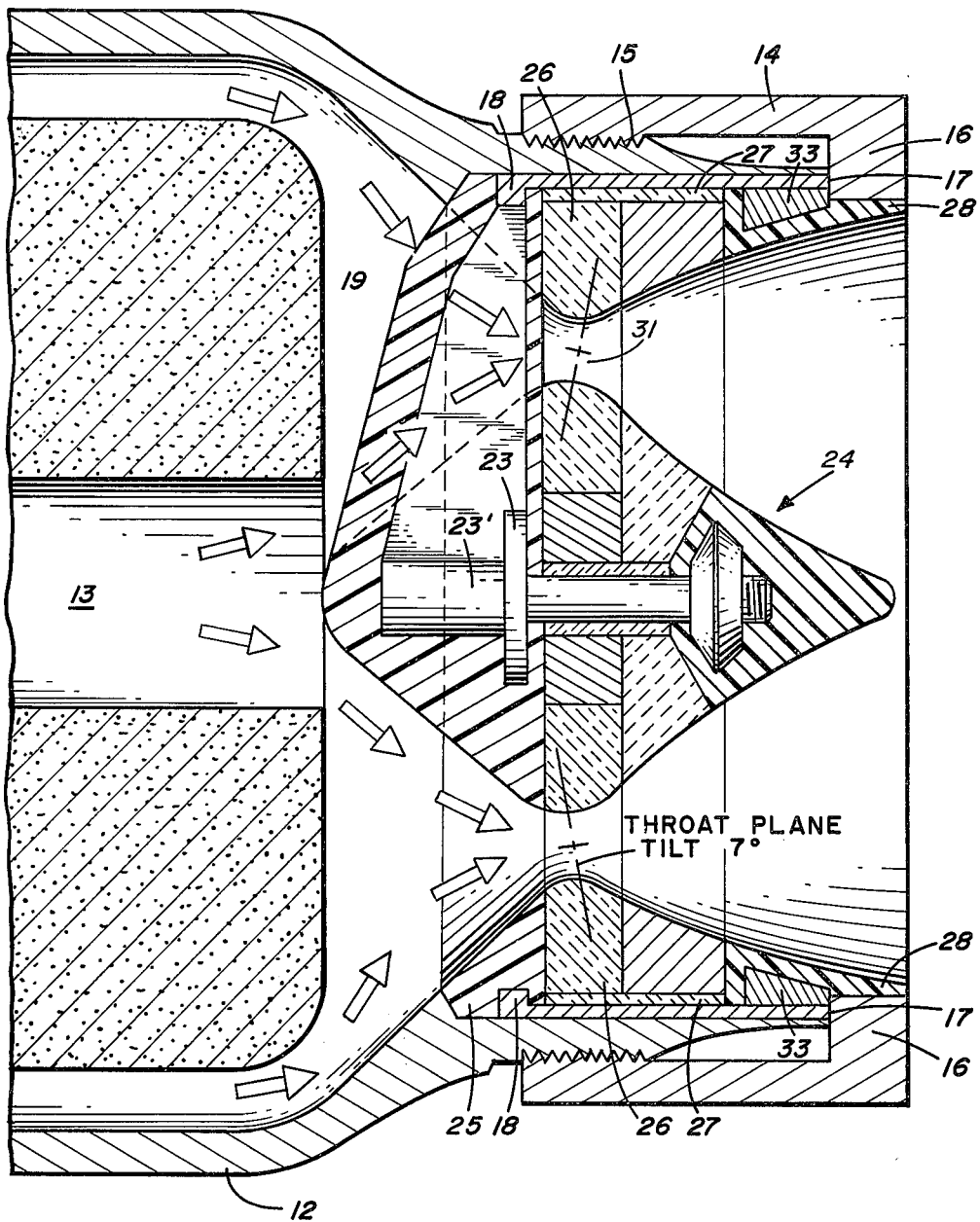
FIG. 11 shows the nozzle as secured to the casing of a rocket motor, the flow of exhaust gases in the contoured nozzle and the tilt of the throat area.

Ballistic optimization of the throat and exit contour make it necessary to tilt the throat plane inward about 7°, as shown at 41 in FIG. 11.

The use of an annular nozzle has resulted in an improved performance because of better thrust and because the shorter length of nozzle permits larger grain size in the same overall length of rocket motor. The following tables summarize a comparison between straight wall and contoured wall nozzles.

NOZZLE DESIGN SUMMARY

| Nozzle Length, in. (Throat to Exit Plane) | Wall Angles[1], Deg Inner | Outer | Initial Flow Direction at Throat, Deg from Centerline | Vacuum Thrust[2] Coefficient |
|---|---|---|---|---|
| STRAIGHT WALL ANNULAR NOZZLE ||||| 
| 1.5 | 44 | 26.4 | −8.8 | 1.569 |
| 2.0 | 36 | 20.3 | −7.8 | 1.597 |
| 2.25 | 32 | 19.1 | −6.5 | |
| 2.5 | 30 | 16.7 | −6.7 | 1.712 |
| 3.0 | 26 | 13.7 | −6.2 | 1.732 |
| 3.5 | 22 | 12.4 | −4.8 | 1.683 |
| 4.0 | 20 | 10.5 | −4.8 | 1.725 |
| 4.5 | 18 | 9.3 | −4.4 | 1.731 |
| 5.0 | 16 | 8.6 | −3.7 | 1.702 |
| CONTOURED WALL ANNULAR NOZZLE |||||
| 1.5 | 48 | 30.0 | −8.8 | 1.558 |
| 2.25 | 38 | 24.6 | −7.2 | 1.625 |
| 3.0 | 30 | 18.0 | −6.1 | 1.643 |
| REFERENCE CONICAL NOZZLE |||||
| 4.5 | — | 18.5 | — | 1.601 |

[1]Slope of tangency of circular and parabolic contours in the case of contoured nozzles
[2]Divergence losses omitted

What is claimed is:

1. A composite annular nozzle for rocket motors comprising:
    a steel shell forming a can-like body;
    tripod arms secured at their free extremities to the shell;
    a steel pin secured to the center of the tripod arms and extending aft substantially concentric with the shell body;
    contoured inner walls formed of sections of materials other than steel secured to the inner wall of the shell body, said inner wall forming the outer contoured surface of the nozzle;
    sections formed of a material other than steel, which when assembled on the center pin form a substantially cone shaped centerbody, the contoured outer shape of the centerbody forming the inner walls of the nozzle;
    wherein the aft insert of the outer and inner contoured walls is formed of silica phenolic molding compound;
    whereby an annular throat section is formed at the portion of narrowest opening between the outer wall and the inner wall of the nozzle.

2. A composite annular nozzle according to claim 1 and including insulating members between the steel sections and those of other metal.

3. A composite annular nozzle according to claim 2 wherein the insulating sections are of pyrolytic-graphite.

4. A composite annular nozzle according to claim 3 wherein the *a* direction of the pyrolytic-graphite is arranged to produce the greatest thermal conductivity.

5. A composite annular nozzle according to claim 1 in which the steel pin attached to the tripod arms is formed with an annular shoulder to absorb some of the stress.

6. A composite annular nozzle according to claim 1 in which the contoured outer and inner walls form a narrow throat area.

7. A composite annular nozzle according to claim 6 in which the shortest distance across the throat area is 7° from a diametric line passing through the throat area.

8. A composite annular nozzle according to claim 6 in which the material forming that portion of the contoured inner and outer walls of the nozzle is pyrolytic-graphite.

9. A composite annular nozzle according to claim 8 in which the pyrolytic-graphite is arranged with its *a* direction substantially normal to the longitudinal axis of the nozzle.

* * * * *